(12) United States Patent
Tushinskiy

(10) Patent No.: US 10,614,487 B1
(45) Date of Patent: Apr. 7, 2020

(54) SERVER FOR ENABLING VOICE-RESPONSIVE CONTENT AS PART OF A MEDIA STREAM TO AN END USER ON A REMOTE DEVICE

(71) Applicant: INSTREAMATIC, INC., San Francisco, CA (US)

(72) Inventor: Stanislav Tushinskiy, Mountain View, CA (US)

(73) Assignee: INSTREAMATIC, INC., San Francisco, CA (US)

( * ) Notice: Subject to any disclaimer, the term of this patent is extended or adjusted under 35 U.S.C. 154(b) by 0 days.

(21) Appl. No.: 16/692,610

(22) Filed: Nov. 22, 2019

Related U.S. Application Data

(63) Continuation-in-part of application No. 16/506,802, filed on Jul. 9, 2019, now Pat. No. 10,522,146, and a continuation-in-part of application No. PCT/US2018/035913, filed on Jun. 4, 2018.

(60) Provisional application No. 62/626,335, filed on Feb. 5, 2018, provisional application No. 62/609,896, filed
(Continued)

(51) Int. Cl.
*G06Q 30/02* (2012.01)
*G06F 3/16* (2006.01)
*G10L 15/22* (2006.01)
*G10L 15/30* (2013.01)
*G10L 15/18* (2013.01)

(52) U.S. Cl.
CPC ........ *G06Q 30/0251* (2013.01); *G06F 3/165* (2013.01); *G10L 15/1815* (2013.01); *G10L 15/22* (2013.01); *G10L 15/30* (2013.01); *G10L 2015/223* (2013.01)

(58) Field of Classification Search
CPC ...................................................... G06Q 30/02
See application file for complete search history.

(56) References Cited

U.S. PATENT DOCUMENTS

| 10,347,247 B2 * | 7/2019 | Bhaya ................... G10L 21/003 |
| 2014/0067395 A1 | 3/2014 | Balasubramanian et al. |

(Continued)

OTHER PUBLICATIONS

Chen Gong et al: "In-Depth Survey of Digital Advertising Technologies", IEEE Communications Surveys & Tutorials, vol. 18, No. 3, Jan. 25, 2016 (Jan. 25, 2016), pp. 2124-2148.

*Primary Examiner* — Marilyn G Macasiano
(74) *Attorney, Agent, or Firm* — Georgiy L. Khayet

(57) ABSTRACT

System and methods for enabling, by a server, voice-responsive content as part of a media stream to an end-user on a remote device are disclosed. An example method comprises sending first device instructions to the remote device with the media stream, the first device instructions including an initiation module that determines whether the remote device has a voice-responsive component and sends, to the server, an indication of the existence of the voice-responsive component; sending, to the remote device, second device instructions, the second device instructions including an interaction initiation module that presents an interaction to the end-user; sending, to the server, voice information from the voice-responsive component; analyzing the voice information to determine an end-user response and end-user impersonal data to generate third device instructions; and sending the third device instructions to the remote device to perform an action based on the voice information.

20 Claims, 14 Drawing Sheets

Related U.S. Application Data on Dec. 22, 2017, provisional application No. 62/514,892, filed on Jun. 4, 2017.

(56) References Cited

U.S. PATENT DOCUMENTS

| | | | |
|---|---|---|---|
| 2019/0120649 A1* | 4/2019 | Seok | G01C 21/3608 |
| 2019/0265946 A1* | 8/2019 | Bae | H04M 1/72569 |

* cited by examiner

SERVER FOR ENABLING VOICE-RESPONSIVE CONTENT AS PART OF A MEDIA STREAM TO AN END USER ON A REMOTE DEVICE

CROSS-REFERENCE TO RELATED APPLICATIONS

This application is a Continuation-in-Part of PCT application No. PCT/US2018/035913, titled "Server for Enabling Voice-Responsive Content as Part of a Media Stream to an End User on a Remote Device," filed Jun. 4, 2018, which claims the benefit of U.S. provisional application No. 62/514,892, filed Jun. 4, 2017, U.S. provisional application No. 62/609,896, filed Dec. 22, 2017, and U.S. provisional application No. 62/626,335, filed Feb. 5, 2018. This application is also a Continuation-in-Part of U.S. application Ser. No. 16/506,802, titled "Systems and Methods for Recognizing and Performing Voice Commands During Advertisement," filed Jul. 9, 2019. The subject matter of the aforementioned applications is incorporated herein for all purposes.

TECHNICAL FIELD

This disclosure generally relates to the field of digital advertising software. More specifically, but not exclusively, this disclosure relates to Internet based interactive software for audio advertising over the Internet.

BACKGROUND

Advertising is a key revenue generator for many enterprises both in offline media (television (TV), newspaper) as well as online (search/contextual, ad-supported media content services, mobile) whereby the latter already represents $79 billion in the US alone, soon to surpass all TV advertising. However, the vast majority of untapped "advertisement inventory" for advertising resides with voice communications themselves. Voice communication is the most native, natural and effective form of human-to-human communication, and with dramatic improvements in speech recognition (Speech To Text, or STT) and speech synthesis (Text To Speech, or TTS) technology over the past years, so too is the natural progression for human-to-machine communication becoming native and replacing the habit for tapping and swiping on smartphone screens, accelerated by voice-first platform devices such as Amazon Alexa® (Alexa® is a registered trademark of Amazon Technologies, Inc. of Seattle, Wash.), Google Home (Google Home is an unregistered tradename of Alphabet, Inc. of Mountain View, Calif.), Samsung Bixby® (Bixby® is a registered trademark of Samsung Electronics Co., Ltd. of Suwan, Gyeonggi-do province of South Korea), and similar devices.

Such voice communications may be processed by personal computers (PCs), laptops, mobile phones, voice-interface platform devices (Amazon Alexa®, Google Home, and so forth) and other end-user devices that allow user-specific communications. For that matter, even some point-of-sale (POS) devices allow interactive, voice-activated communication between a user and an automated response system, and may also allow for advertising/sponsor messaging.

In general, digital audio ads today replicate radio advertising in that they are 30 second-long pre-recorded audio messages without any engagement ability. Digital audio advertisement is the choice of top-tier brands who strive for brand image enhancement. It is also a great tool for small and medium businesses who want to reach a greater audience but have a limited budget.

SUMMARY

The present disclosure relates to the field of digital advertisements, and in particular to a voice-activated advertising method for a digital device platform having a connection to the Internet and user devices with built-in microphones. An example method includes generation and digital insertion of advertisements, such as a pre-recorded audio advertisement or text-to-speech generated voice advertisement, recording user's voice response to the advertisement and understanding user intent, providing advertisement response back to the user based on intended internal advertisement logic, analysis of the end-user device and user data for further user engagement with the user through voice-activated audio advertisement.

Voice communications include a significant amount of information that may help target advertisements to users. This information is not utilized today. A problem for media companies and audio publishers is advertising injection during hands-free and screen-free interaction with devices and/or audio content consumption. Developments and adoption of voice interfaces among users is making it possible to create and serve voice-activated ads that may serve responses to user's commands.

The present disclosure includes methods and systems of serving and delivering of advertisements and subsequent end-user interaction via voice with the advertisement. Also described herein are methods of a computing device's reactions to the various voice commands by the end-user, received upon the initial advertising message as well as on the subsequent responses by the computer program. The results of the voice interaction involve targeted actions which include, but are not limited to, dialing a number, sending a text message, opening a link in a browser, skipping advertising, requesting more information, adding an event to calendar, adding a product to a shopping cart, setting up a reminder, saving a coupon, adding a task to a to-do list, and so forth.

Embodiments of the disclosure provide a schematic and method of interaction of the end-user device with the voice recognition system and its subsequent interpretation into targeted actions by the management system of the advertising network, including in itself an advertisement serving module, advertisement logic, Advertisement analysis, and interaction with an advertisement serving with TTS system.

The first aspect of the disclosure includes a method for advertisement view request that includes information concerning user and their current environment. The method may include the user device sending its request to an advertisement network to obtain an advertisement. Such a request may include information about advertisement format and user information such as social and demographic characteristics, interests, current location, current business (current context), and so forth. The method allows the receipt of a current advertisement offer (if any) at the most appropriate time to be of interest to the user.

The second aspect of the disclosure includes the method of selecting an advertisement with an offer for the user. In this aspect, the method involves the advertisement network analyzing data received upon the request received from the user device, comparing the request with current offers and advertiser requirements for the target audience, and selecting the optimal offer for the current user based on the above data and analysis of other users' reaction to similar advertisement offers. As a result, the offer selected is one which is more likely to be of interest to the user.

The third aspect of the disclosure includes generating an advertisement message for a user. In advertising campaigns, where applicable, based on the advertisement offer selected, an advertising network Artificial Intelligence (AI) core analyzes data specified in the second aspect, and also analyzes historical data on different categories of users' reactions to various advertising messages. In the event the advertising campaign already contains an advertising message which was provided by the advertiser, the AI Core analyzes an expected effectiveness of such message. Following the results of the analysis, and taking into account any features of a particular user and his environment, an advertising message is generated, which may include text, sound, and visual content. The method generates advertising messages that are more likely to be of interest to the user at a given time. In addition, this aspect allows for the generation of response messages to the user's reaction, thereby keeping in dialogue with the user.

A fourth aspect of the disclosure includes advertising message transfer to the user. In this aspect of the method, messages are generated in the advertisement network and transferred to the user device. This method provides the transfer of instantaneously current advertising messages to the user, whenever applicable, thereby increasing interactivity of interaction.

A fifth aspect of the disclosure includes the method of user interaction with an advertising message via the user's voice. In this aspect, the user may use his voice to dial a telephone number, text a message, open a link in a browser, skip advertising, request more information, add an event to his calendar, add a product to a shopping cart, set up a reminder, save a coupon, add a task to a to-do list, and so forth The command is recognized on the device or in the voice recognition and interpretation network and interpreted and executed accordingly. The method ensures appropriate interaction with the user and thereby increases user involvement in the process.

A sixth aspect of the disclosure includes constant improvement of a quality of the advertisement offers selected and advertising messages generated. In this aspect, the advertisement system fixes all results of interaction with the users and uses this data in further work for analysis in new offer selection and new message generation. This aspect of the method constantly improves in quality of advertisement for the user, thereby increasing conversion.

A seventh aspect of the disclosure includes software for implementing the above methods and interaction support with other software components which are used in the advertisement systems. Implementation may include several interrelated features: advertisement injection to receive and reproduce advertisement on users' devices; advertisement platform Interface to implement an interface, which provides for interaction between the users' devices and advertisement network; advertisement server to organize interaction between an advertisement network and a user's devices; advertisement logic to organize interaction between various components of an advertisement network with each other in order to select advertisement offers for users and account for requirements of advertisers; Data Management Platform to store and access data concerning users and their devices; AI Core to generate targeted messages for users; TTS to convert text into voice speech; Voice Recognition to recognize a user's voice; and Voice Command Interpretation to interpret a recognized voice into specific commands; all of which are tailored for the unique characteristics of voice interaction, particularly on mobile devices.

According to one example embodiment of the present disclosure, a server for enabling voice-responsive content as part of a media stream to an end-user on a remote device is provided. The server may include one or more processors and a memory storing processor-executable codes, wherein, upon executing the processor-executable codes, the processors execute a method for enabling voice-responsive content as part of a media stream to an end-user on a remote device.

The method may include sending first device instructions to the remote device with the media stream. The first device instructions may include an initiation module that determines whether the remote device has a voice-responsive component. Upon determination of the voice-responsive component, the initiation module activates the voice-responsive component on the remote device and sends, to the server, an indication of the existence of the voice-responsive component.

The method may include sending, to the remote device, second device instructions. The second device instructions may include an interaction initiation module that presents an interaction to the end-user over the remote device, and sends, to the server, voice information from the voice-responsive component of the remote device.

The method may include, upon receiving the voice information, analyzing the voice information to determine an end-user response and end-user impersonal data. The method may also include generating, based partially on the end-user response and the end-user impersonal data, third device instructions. The method may also include sending the third device instructions to the remote device to perform at least one action based on the voice information.

The interaction initiation module may present the interaction to the end-user concurrently with presenting the media stream to the end-user. The third device instructions may include a further interaction for presentation by the interaction initiation module. The interaction can be presented between items of content of the media stream, during presentation of downloaded content, and while playing a game.

The third device instructions can be generated based on data concerning previous third device instructions sent to the remote device and data concerning previous voice information received from the remote device.

The method may include generating, based on the voice information, a voice response to the user. The third device instructions may include the voice response to the user for playing back on the remote device.

The method may include collecting historical data related to previous second device instructions sent to the remote device, data concerning the end-user, and data received from the remote device. The collected historical data can be used to generate the second device instructions to present a customized interaction.

The end-user impersonal data may include an age range of the end-user, a gender of the end-user, emotions of the end-user during the interaction, and an indication of a potential chronic or non-chronic illness that the end-user may have. The third device instructions may include an advertisement selected based on the end-user impersonal data.

The initiation module may send, to the server, information about the remote device and information about the end-user. The third device instructions can be generated based on at least one of the information about the remote device and the information about the end-user. The information about the remote device may include current geolocation data of the remote device. The third device instructions may include an advertisement selected based on the current geolocation data.

The second device instructions may include muting the media stream and presenting the interaction as audio advertisements in a separate audio stream.

According to an example embodiment of the disclosure, there is provided a non-transitory processor-readable medium, which stores processor-readable instructions. When the processor-readable instructions are executed by a processor, they cause the processor to implement the above-mentioned method for enabling voice-responsive content as part of a media stream to an end-user on a remote device.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
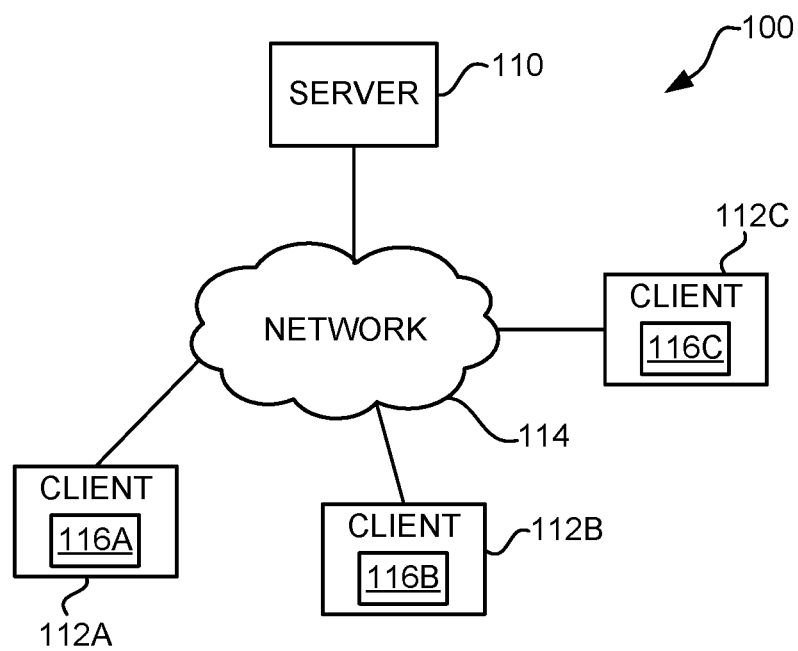
FIG. 1 is a schematic diagrammatic view of a network system in which embodiments of the present disclosure may be utilized.

Corresponding reference characters indicate corresponding parts throughout the several views. Although the drawings represent embodiments of the present disclosure, the drawings are not necessarily to scale and certain features may be exaggerated in order to better illustrate and explain the full scope of the present disclosure. The flow charts and screen shots are also representative in nature, and actual embodiments of the disclosure may include further features or steps not shown in the drawings. The exemplification set out herein illustrates an embodiment of the disclosure, in one form, and such exemplifications are not to be construed as limiting the scope of the disclosure in any manner.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

Further, the manipulations performed are often referred to in terms, such as comparing or adding, commonly associated with mental operations performed by a human operator. No such capability of a human operator is necessary, or desirable in most cases, in any of the operations described herein which form part of embodiments of the present disclosure; the operations are machine operations. Useful machines for performing the operations of one or more embodiments of the present disclosure include general purpose digital computers or other similar devices. In all cases the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather as a result of an instruction.

Some embodiments of the present disclosure also relate to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipment through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

Embodiments of the present disclosure may deal with "object-oriented" software, and particularly with an "object-oriented" operating system. The "object-oriented" software is organized into "objects," each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions (for example, by a user activating an icon with a "mouse" pointer generating an event). Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system may be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions, which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which may be activated directly or indirectly by the user. The terms "windowing environment," "running in windows," and "object oriented operating system" are used to denote a computer user interface in which information is manipulated and displayed on a video display such as within bounded regions on a raster scanned, liquid crystal matrix, or plasma based video display (or any similar type video display that may be developed). The terms "network," "local area network (LAN)," or "wide area network (WAN)," mean two or more computers which are connected in such a manner that messages may be transmitted between the computers. In such computer networks, typically one or more computers operate as a "server," a computer with large storage devices such as hard disk drives and communication hardware to operate peripheral devices such as printers or modems. Other computers, termed "workstations," provide a user interface so that users of computer networks may access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis. A "module" refers to a portion of a computer system and/or software program that carries out one or more specific functions and may be used alone or combined with other modules of the same system or program.

The term "desktop" means a specific user interface which presents a menu or display of objects with associated settings for the user associated with the desktop. When the desktop accesses a network resource, which typically requires an application program to execute on the remote server, the desktop calls an Application Program Interface (API) to allow the user to provide commands to the network resource and observe any output. The term "browser" refers to a program which is not necessarily apparent to the user, but which is responsible for transmitting messages between the desktop and the network server and for displaying and interacting with the network user. Browsers are designed to utilize a communications protocol for transmission of text and graphic information over a worldwide network of computers, namely the "World Wide Web" or simply the "Web." Examples of browsers compatible with one or more embodiments of the present disclosure include the Chrome browser program developed by Google Inc. of Mountain View, Calif. (Chrome is a trademark of Google Inc.), the Safari browser program developed by Apple Inc. of Cupertino, Calif. (Safari is a registered trademark of Apple Inc.), Internet Explorer program developed by Microsoft Corporation (Internet Explorer is a trademark of Microsoft Corporation), the Opera browser program created by Opera Software ASA, or the Firefox browser program distributed by the Mozilla Foundation (Firefox is a registered trademark of the Mozilla Foundation). Although the following description details such operations in terms of a graphic user interface of a browser, one or more embodiments of the present disclosure may be practiced with text based interfaces, or even with voice or visually activated interfaces, that have many of the functions of a graphic based Browser.

Browsers display information which is formatted in a Standard Generalized Markup Language (SGML) or a HyperText Markup Language (HTML), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language (XML) file, with XML files being capable of use with several Document Type Definitions (DTD) and thus more general in nature than SGML or HTML. The XML file may be analogized to an object, as the data and the stylesheet formatting are separately contained (formatting may be thought of as methods of displaying information, thus an XML file has data and an associated method). Similarly, JavaScript Object Notation (JSON) may be used to convert between data file formats.

The terms "personal digital assistant (PDA)" or smartphone as defined above mean any handheld, mobile device that combines two or more of computing, telephone, fax, e-mail and networking features. The term "wireless wide area network (WWAN)" means a wireless network that serves as the medium for the transmission of data between a handheld device and a computer. The term "synchronization" means the exchanging of information between a first device, e.g., a handheld device, and a second device, e.g., a desktop computer or a computer network, either via wires or wirelessly. Synchronization ensures that the data on both devices are identical (at least at the time of synchronization).

Data may also be synchronized between computer systems and telephony systems. Such systems are known and include keypad based data entry over a telephone line, voice recognition over a telephone line, and voice over internet protocol ("VoIP"). In this way, computer systems may recognize callers by associating particular numbers with known identities. More sophisticated call center software systems integrate computer information processing and telephony exchanges. Such systems initially were based on fixed wired telephony connections, but such systems have migrated to wireless technology.

In WWANs, communication primarily occurs through the transmission of radio signals over analog, digital cellular or personal communications service (PCS) networks. Signals may also be transmitted through microwaves and other electromagnetic waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), personal digital cellular (PDC), or through packet-data technology over analog systems such as cellular digital packet data (CDPD) used on the Advance Mobile Phone Service (AMPS).

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java and Java ME (Java and JavaME are trademarks of Sun Microsystems, Inc. of Santa Clara, Calif.), BREW (BREW is a registered trademark of Qualcomm Incorporated of San Diego, Calif.), Windows Mobile (Windows is a registered trademark of Microsoft Corporation of Redmond, Wash.), Palm OS (Palm is a registered trademark of Palm, Inc. of Sunnyvale, Calif.), Symbian OS (Symbian is a registered trademark of Symbian Software Limited Corporation of London, United Kingdom), ANDROID OS (ANDROID is a registered trademark of Google, Inc. of Mountain View, Calif.), and iPhone OS (iPhone is a registered trademark of Apple, Inc. of Cupertino, Calif.), and Windows Phone 7. "Mobile Apps" refers to software programs written for execution with Mobile Software.

"Speech recognition" and "speech recognition software" refer to software for performing both articulatory speech recognition and automatic speech recognition. Articulatory speech recognition refers to the recovery of speech (in forms of phonemes, syllables, or words) from acoustic signals with the help of articulatory modeling or an extra input of articulatory movement data. Automatic speech recognition or acoustic speech recognition refers to the recovery of speech from acoustics (sound wave) only. Articulatory information is extremely helpful when the acoustic input is in low quality, perhaps because of noise or missing data. In the present disclosure, speech recognition software refers to both variations unless otherwise indicated and obvious from context.

AI refers to software techniques that analyze problems similar to human thought processes, or at least mimic the results of such thought processes, through the use of software for machine cognition, machine learning algorithmic development, and related programming techniques. Thus, in the context of the present disclosure, AI refers to the algorithmic improvements over original algorithms by application of such software, particularly with the use of data collected in the processes disclosed in this application.

FIG. 1 is a high-level block diagram of a computing environment 100 according to one embodiment. FIG. 1 illustrates server 110 and three clients 112 connected by network 114. Only three clients 112 are shown in FIG. 1 in order to simplify and clarify the description. Embodiments of computing environment 100 may have thousands or millions of clients 112 connected to network 114 (for example, the Internet). Users (not shown) may operate software 116 on one of clients 112 to both send and receive messages over network 114 via server 110 and its associated communications equipment and software (not shown).

Figure 2:
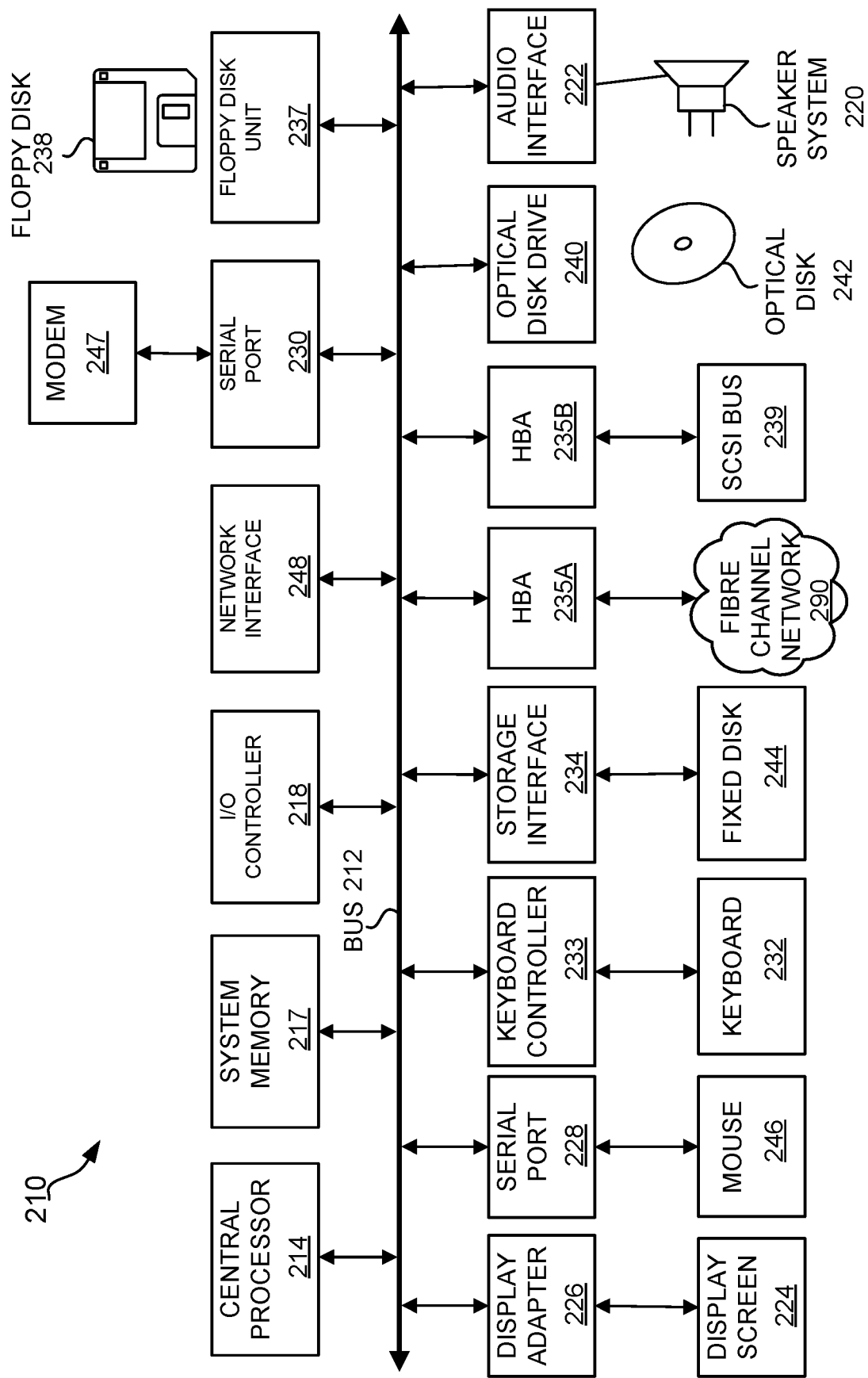
FIG. 2 is a block diagram of a computing system (either a server or client, or both, as appropriate), with optional input devices (e.g., keyboard, mouse, touch screen, and so forth) and output devices, hardware, network connections, one or more processors, memory/storage for data and modules, and so forth which may be utilized in conjunction with embodiments of the present disclosure.

FIG. 2 depicts a block diagram of computer system 210 suitable for implementing server 110 or client 112. Computer system 210 includes bus 212 which interconnects major subsystems of computer system 210, such as central processor 214; system memory 217 (typically RAM, but which may also include ROM, flash RAM, or the like); input/output controller 218; external audio device, such as speaker system 220 via audio output interface 222; external device, such as display screen 224 via display adapter 226; serial ports 228 and 230; keyboard 232 (interfaced with keyboard controller 233); storage interface 234; disk drive 237 operative to receive floppy disk 238 (disk drive 237 is used to represent various types of removable memory such as flash drives, memory sticks, and the like); host bus adapter (HBA) interface card 235A operative to connect with Fibre Channel network 290; HBA interface card 235B operative to connect to SCSI bus 239; and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include ROM or flash memory (neither shown) and RAM (not shown), as previously noted. RAM is generally main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk drive 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, CDPD connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. Devices and subsystems may be interconnected in different ways from that shown in FIG. 2. Operation of a computer system such as that shown in FIG. 2 is readily known in the art and is not discussed in detail in this application. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system. In some embodiments, computer system 210 may take the form of a tablet computer, typically in the form of a large display screen operated by touching the screen. In tablet computer alternative embodiments, the operating system may be iOS® (iOS is a registered trademark of Cisco Systems, Inc. of San Jose, Calif., used under license by Apple Corporation of Cupertino, Calif.), Android® (Android is a trademark of Google Inc. of Mountain View, Calif.), Blackberry® Tablet OS (Blackberry is a registered trademark of Research In Motion of Waterloo, Ontario, Canada), webOS (webOS is a trademark of Hewlett-Packard Development Company, L.P. of Texas), and/or other suitable tablet operating systems.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
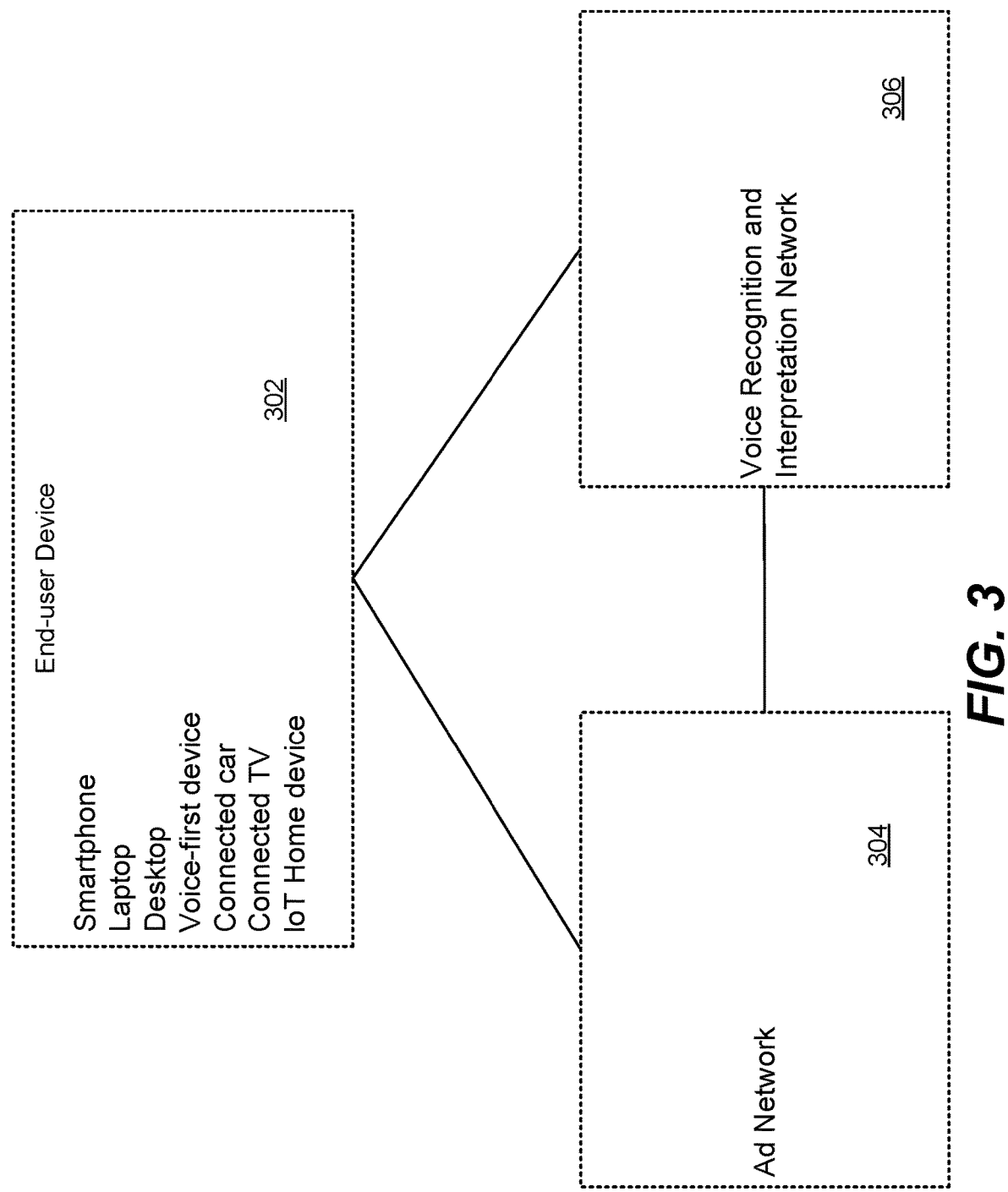
FIG. 3 is a high-level diagram of a system that is operable to perform a method for serving voice-responsive advertising with multi-stage interaction by means of voice interface.

FIG. 3 is a high-level diagram of a system that is operable to perform a method for serving voice-responsive advertising with multi-stage interaction by means of a voice interface.

The diagram of FIG. 3 shows how a program application on end-user device 302 (which may be a digital radio app, music service, game, activity app, and so forth) according to internal logic sends the advertising request, including available data concerning the user's device, data from user's device including gyroscope position, GPS data, and so forth, and anonymized data concerning the user, to Advertisement Network 304. On the basis of processing results of received data and other available data, Advertisement Network 304 sends advertising materials into the application, which may include text, audio, and video material. During the reproduction of the advertisement or after a special identified moment within the advertisement itself, an App on user device 302 turns on the user's device microphone and begins to record audio. At this time, the user may use his/her voice to say a voice command. The advertisement platform (typically a part of advertisement network 304, but in some embodiments, many be separate and distinct) sends the recorded audio file via an interface to voice recognition system 306. The user's speech recognized in the form of words is sent to the interpretation module (typically part of network 306, but in some embodiments may be separate and distinct), which interprets the words into targeted actions. The speech interpretation module determines the highest probability targeted actions and informs of this to advertisement network 304. On the basis of internal logic and methods, advertisement platform determines the answer to the user, which is then sent to end-user device 302 in the form of audio, video, text, and other information. Upon receiving the answer, the user may subsequently begin interaction again and the method of interaction may be repeated.

As described above, the end-user's device serves as the interface for interaction with the user, as well as initiating receiving of advertisement and may itself provide the speech recognition if its operating software supports such functionality. The computer operation and structure of the advertisement network, the advertisement platform, advertisement injection software and related items are known and thus are not described in detail to facilitate the understanding of the present disclosure.

Figure 4:
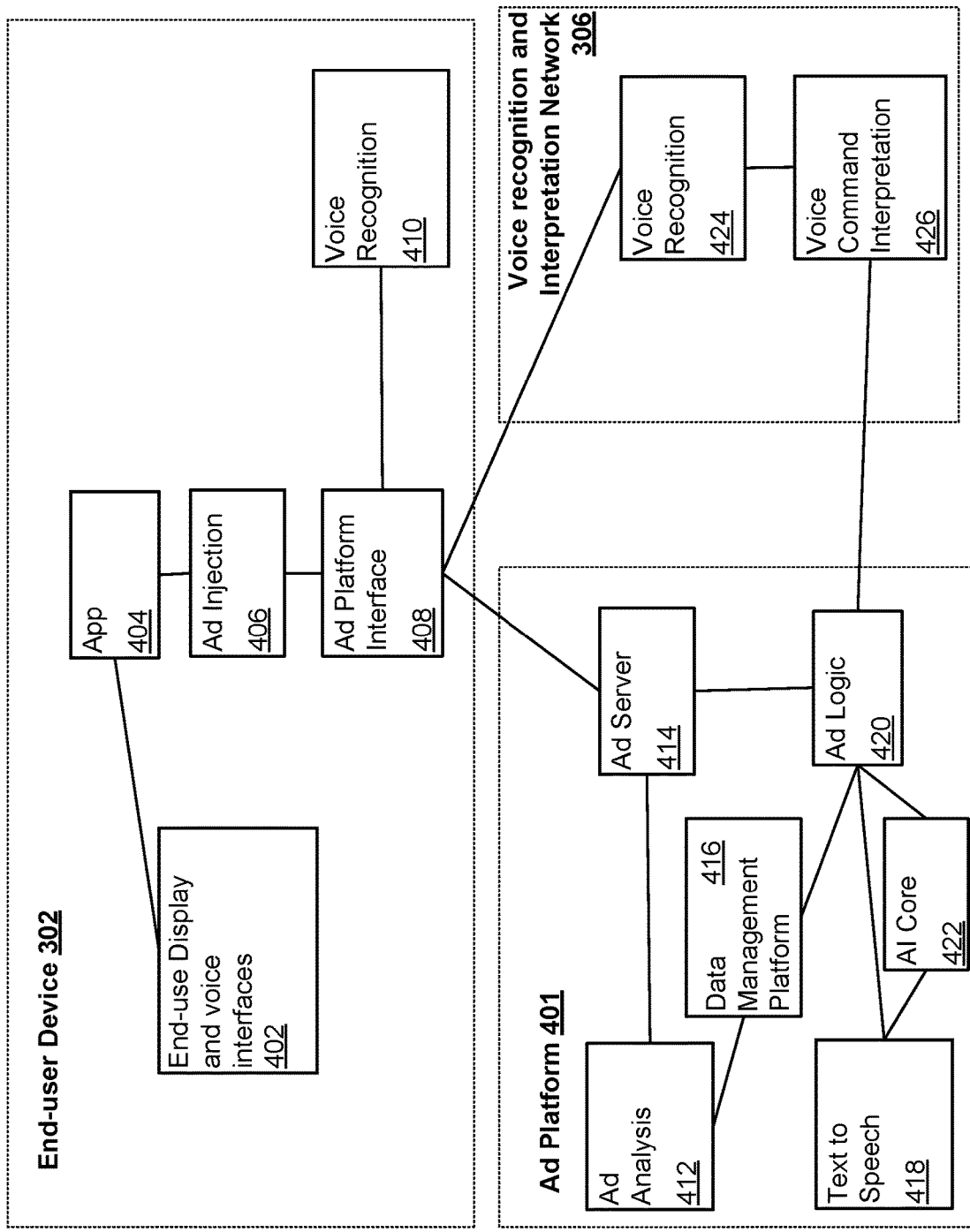
FIG. 4 is a high-level diagram of modules and components responsible for the logical workings and processing of information required for the serving of advertisements, receiving voice responses from the end-user, determining user's intent, and selection and delivery of the reply/answer to the end-user.

FIG. 4 illustrates the interaction and working logic of various components which may be used in the delivery of multi-stage voice-responsive advertising. The components may include end-user device 302, voice recognition and interpretation network 306, and Advertisement Platform 401.

Advertisement Injection software 406 on end-user application 404 serves an advertisement and begins to recognize speech. If the end-user's device supports speech recognition, then conversion of speech into text is processed on the device. If not, then Advertisement Injection 406 sends the recorded audio file with the user's response via Advertisement Platform Interface 408 to voice recognition system 424. The recognized speech in the form of received text words is sent to voice interpretation Module 426 to determine from the word text which targeted actions are most applicable. Voice interpretation module 426 determines a targeted action with the highest probability of the user responding to with their voice. Targeted actions may include, but are not limited to, the following: dial number, text message, open link in browser, skip advertising, tell more information, add event to calendar, add product to shopping cart, set up reminder, save coupon, add task to to-do list, and so forth The received interpretation is transmitted to advertisement logic system 420, which records the received data at Data Management Platform 416 and determines what action should be performed in reaction to the user's request.

Advertisement Logic 420 performs computation according to algorithms which take into account available data concerning the advertisement recipient and objectives of the advertiser, with such algorithms being known in the art. Advertisement logic 420 uses, but is not limited to, the following data sets involved in processing of end-user's data with the purpose of generating the most engaging answer: end-user's advertisement engagement history, advertisement format usage pattern history, advertised products, reactions to separate stimulating words (e.g. "only today," "right now," end-user's name, "discount," "special offer," "only for you," and so forth), end-user's preferred method of reaction to advertisement (call, skip, receive more info, and so forth), clearly defined brand preferences, collected anonymized data concerning the user, current anonymized data from the end-user device including GPS position, and data concerning end-user contact with other advertisement formats (banner, video ads, TV, and so forth).

In the processing of the advertiser's goals, advertisement logic 420 considerations include, but are not limited to, the following data sets: format of the targeted action (opening link, phone call, a full informing about the product, and so forth), geolocation about the nearest point of sale relative to the end-user, history of purchases for the purpose of narrowing the product specification for product offer (for example, in an advertisement for a coffee shop, the end-user will be offered to voice the preferred method of his coffee preparation, instead of just coffee in general), ability to change the communication content of the advertisement, and consumer preferences of the competitions' products.

advertisement logic 420 determines the most relevant response to the user by analyzing available data weighted with dynamic coefficients according to the inputted logic and advertising campaign goals, which optimally satisfies both the user's and advertiser's request.

If an advertisement campaign supports automatic generation of advertisement responses, then advertisement logic 420 sends the request for answer generation in text form to AI Core 422. AI Core 422 generates the answer in the form of text on the basis of both predetermined algorithms and available data, including but not limited to: user data including sex, age, and name; context of the advertisement; name of product advertised; targeted action and essence of the response communication determined by Advertisement Logic 420; history of interaction with ad; and so forth AI core 422 may also direct text response to TTS Module 418 for the machine-generated speech answer, which may then be transferred to Advertisement logic 420.

Advertisement logic 420 informs advertisement server 414 which audio/video/text material should be transferred to the user as the reaction to his voice command. advertisement server 414 sends the advertising material or other instructions via advertisement platform interface 408, which represents the response reaction to the user's voice command.

The user may react to the received reaction for subsequent initiation of method of voice responsive reaction to the advertisement. If it is determined that the user instructed the skip command or to terminate the advertisement, advertisement platform interface 408 informs App 404 the advertising interaction is completed and that it is time to return to the main functions/content of App 404.

Figure 5:
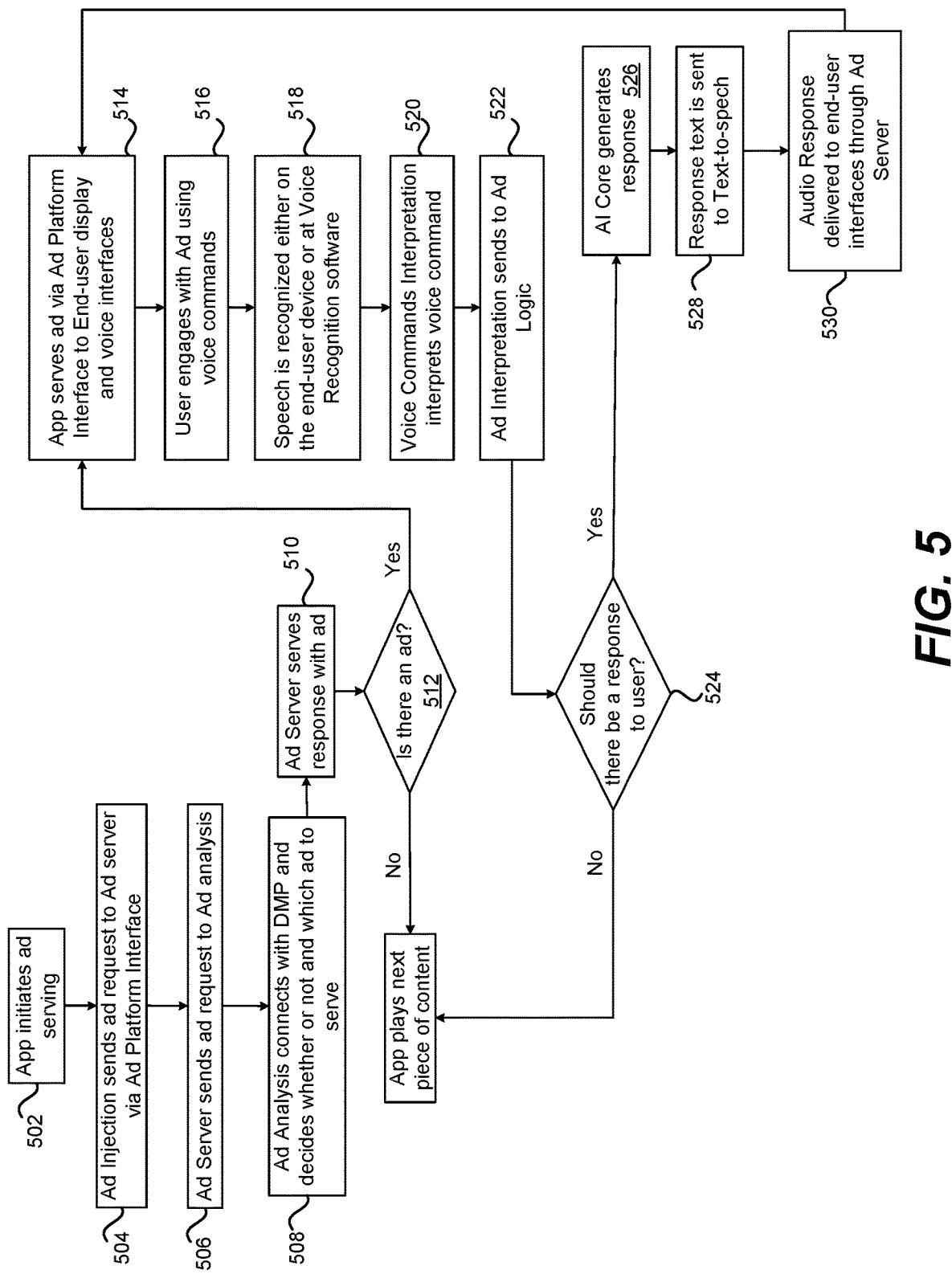
FIG. 5 is a flow chart diagram of a method used to deliver ads, receive voice response from user, perform TTS and further intent interpretation, and decide on and deliver response to user's initial voice response.

FIG. 5 illustrates an exemplary flow chart of the method described herein. In step 502, App 404 initiates advertisement serving request to advertisement injection software 406. As an alternative, advertisement injection software 406 may send advertisement request to advertisement network 304 to download and save advertisement in cache of end-user device 302 before receiving a request from app 404.

In step 504, advertisement injection software 406 sends advertisement request to advertisement network interface 408, which forwards advertisement request to advertisement server 414 providing details of the advertisement format requested and available data from end-user device 302.

In step 506, advertisement server 414 sends advertisement request to advertisement analysis 412, which process all active ads and chooses the best suited for this particular device taking in consideration internal data of each advertisement campaign including prices, frequency, and so forth In step 508, advertisement analysis 412 sends request for additional data concerning the end-user device to data management platform 416 to perform better advertisement targeting. After processing all data, advertisement analysis 412 determines if an advertisement should be served and which advertisement to serve. advertisement analysis 412 sends response with advertisement or negative response to advertisement server 414.

In step 510, advertisement Server 414 serves advertisement or negative response to App 404 via advertisement platform interface 408 and advertisement injection 406.

In step 512, app 404 process its internal logic depending on response from advertisement network 304. If there is no advertisement, then App 404 delivers next piece of content.

In step 514, app 404 communicates an advertisement to the user via end-user display and voice interface 402. In some cases, like radio streaming, advertisement injection 406 may manipulate app 404's content to serve the advertisement over the streaming audio (that is to say that the audio add has a volume sufficient to be separately understood from the streaming audio).

In step 516, the user engages with advertisement using voice commands. As part of the advertisement session, the user first listens to audio/video advertisement content and may respond with a voice command during or after the advertisement content. The user may ask to skip an ad, ask for more information, ask to call a company, and so forth In step 518, user's speech is recognized either on the end-user device or on Voice Recognition 424.

In step 520, voice command interpretation 426 processes incoming user command in the form of text. Each command has a different level of probability so the voice command interpretation 426 chooses a command having the highest probability of user intent.

In step 522, advertisement interpretation sends the result with the highest probability to advertisement logic 420.

In step 524, advertisement logic 420 decides whether to send a negative response (if the user asked to skip an ad) to advertisement server 414, which forwards it to App 404. If user said one of the voice commands, then advertisement logic 420 sends request for generating a response to AI core 422.

In step 526, AI core 422 processes the user's request and data available to generate text response.

In step 528, AI core 422 sends final text response to TTS 418 to record audio response based on the text.

In step 530, AI core 422 forwards audio response to advertisement server 414 via advertisement logic 420, which saves the data of this interaction. Advertisement server 414 communicates the advertisement through advertisement platform Interface 408 and advertisement injection 406 to end-user display and voice interface 402. The user may repeat the flow with the next voice command to the audio response from advertisement network 304.

Figure 6:
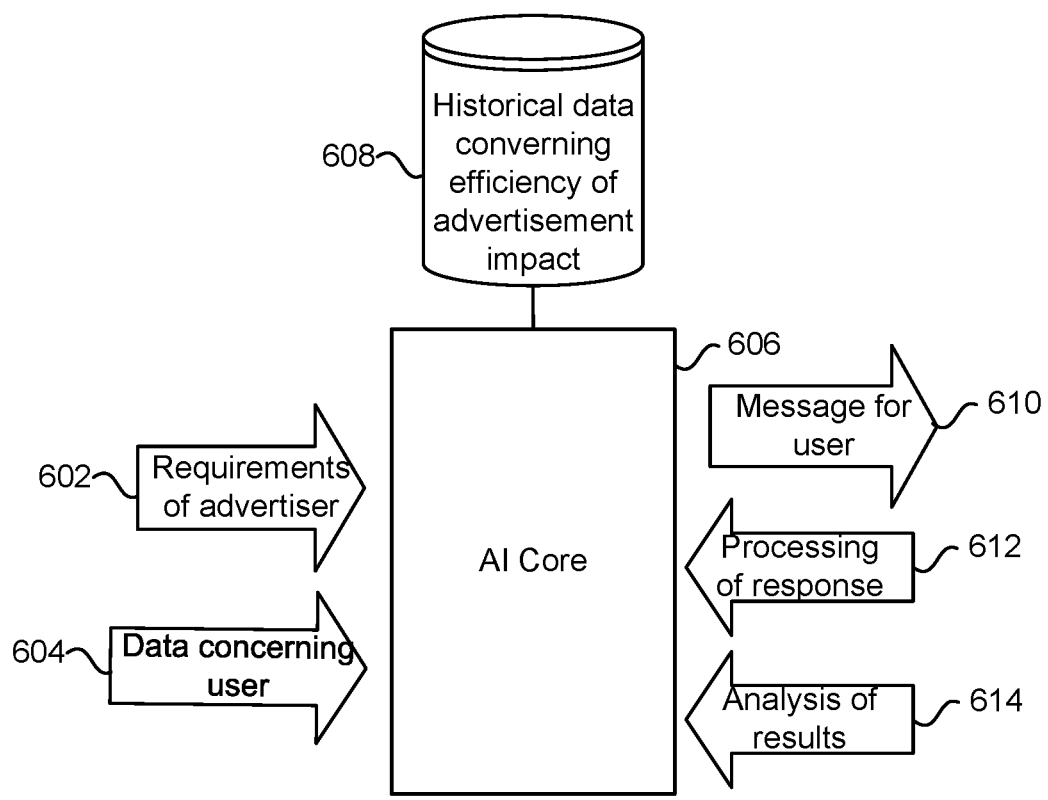
FIG. 6 is a schematic block data flow diagram of AI core operation.

FIG. 6 shows a schematic block data flow diagram of AI core operation. Information about requirements of advertiser 602 and data concerning current user 604, to whom the advertisement needs to be shown, is transferred to AI core 606.

Requirements of advertiser 602 to the target audience may include the following data: Social-demographic properties: location, sex, age, education, marital status, children, occupation, level of income; interests; locations where display of advertisement will be relevant: city, street, specific location on the map or all streets in the indicated radius from the point selected on the map; requirements to advertisement: text blanks or complete texts of advertisements; and target action that a user must perform after listening to advertisement.

An option is allowed when there are no requirements of advertiser except the requirement to target action. In this case, AI core 606 issues target actions on its own based on historical data concerning efficiency of the advertisement impact.

Data concerning user 604 may include: social-demographic properties: location, sex, age, education, marital status, children, occupation, level of income; interests; current location; current environment: what the user is doing, (for example, if he is practicing sports, listening to music or podcast, watching movie), and so forth. Data concerning the user is received in anonymous form and does not allow identifying his person.

AI core 606 performs analysis on the basis of received data 602 and 604 and historical data concerning efficiency of advertisement 608's impact upon users. Analysis is done in terms of the following: advertisements: current advertisement, other advertisements of advertising campaign, including analysis of voice and background supporting music; campaigns: current campaign, other advertising campaigns of the advertiser, campaigns of other advertisers similar to the current one; advertisers: all advertising campaigns of the advertiser, advertising campaigns of all advertisers, including analysis of perceptions of the advertisers by users; users: current user, users similar to the current one, all users, including analysis by social-demographic data, location, and environment, analysis of responses.

As a result of analysis based upon data concerning the user, advertising campaign, advertiser, and historical data, the AI core, through machine learning techniques, determines the best combinations of parameters that influence efficiency of advertisement. The AI core then issues the text, selects voice, background music (if required), and visual component (if required) for advertisement message 610 and sends it to the user. When a response is received from user 612, the component processes it to make a decision about further actions: whether to issues a new message with requested information, ask a clarifying question, or terminate the dialog. When the dialog is finished, the component analyzes its results 614 for their recording into base of historical data concerning efficiency of advertisement 608 efficiency.

Figure 7:
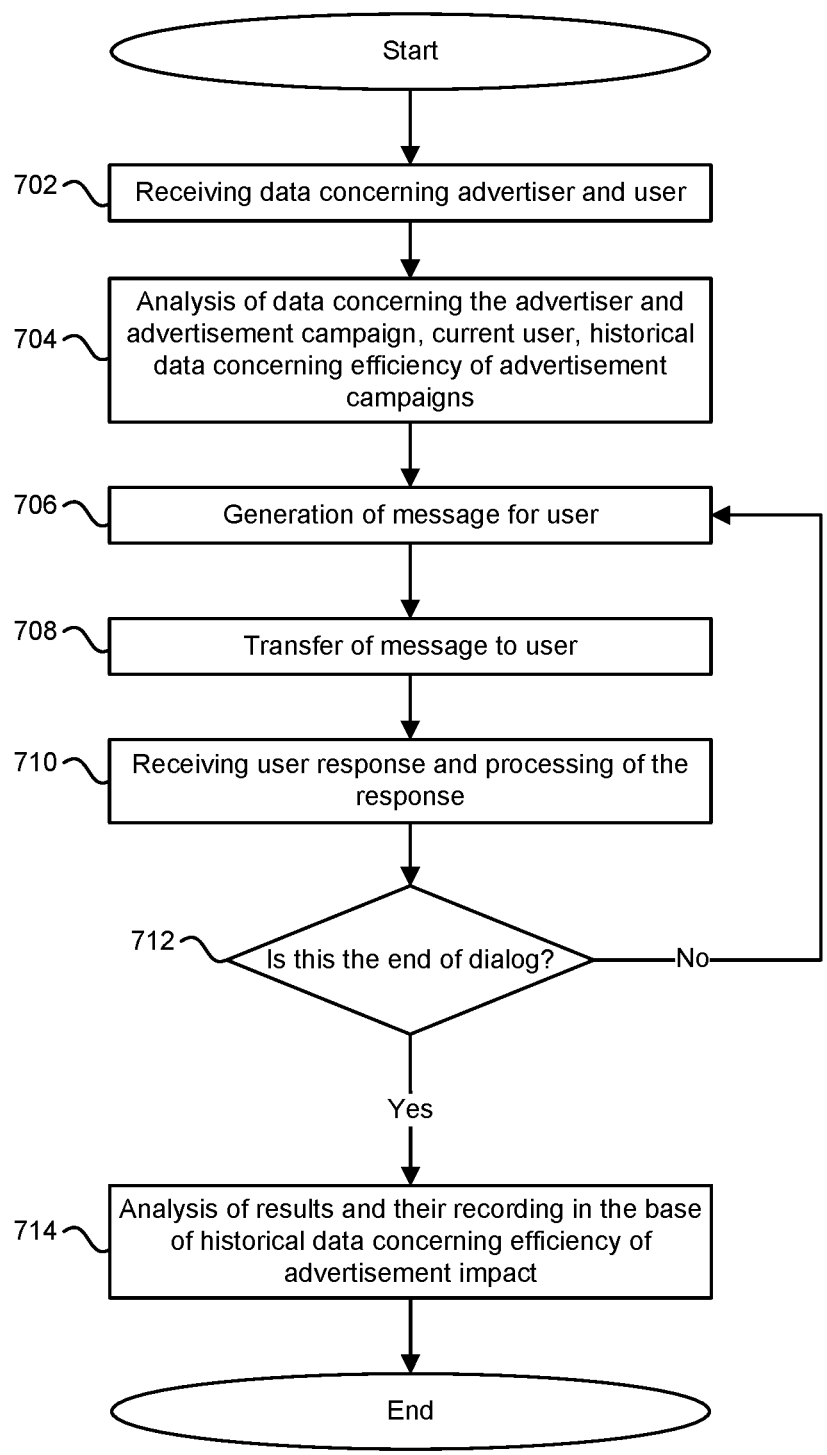
FIG. 7 is a flow chart diagram of one embodiment of an algorithm for AI core operation.

FIG. 7 illustrates one embodiment of an algorithm for AI core operation. At step 702, AI core receives data concerning current user and the advertiser's requirements. At step 704, AI core performs analysis on the basis of received data 602 and 604 and historical data concerning efficiency of advertisement impact onto user 608. At step 706, AI core generates message for user 610. At step 708, AI core transfers advertisement to the user or to another software component for sending to the user. At step 710, AI core receives response from user 712 and processes and interprets the response. At step 712, AI core determines current condition of interaction with the user according to the results of step 710: is this the end of dialog with the user or a new (reply) message must be issued for him. If this is not the end of dialog, AI core returns to step 706 for generation of message. If this is the end of dialog, AI core proceeds to step 714. At step 714, AI core analyzes the results of dialog with user 614 and accordingly refreshes base of historical data concerning efficiency of advertisement 608 impact.

Figure 8:
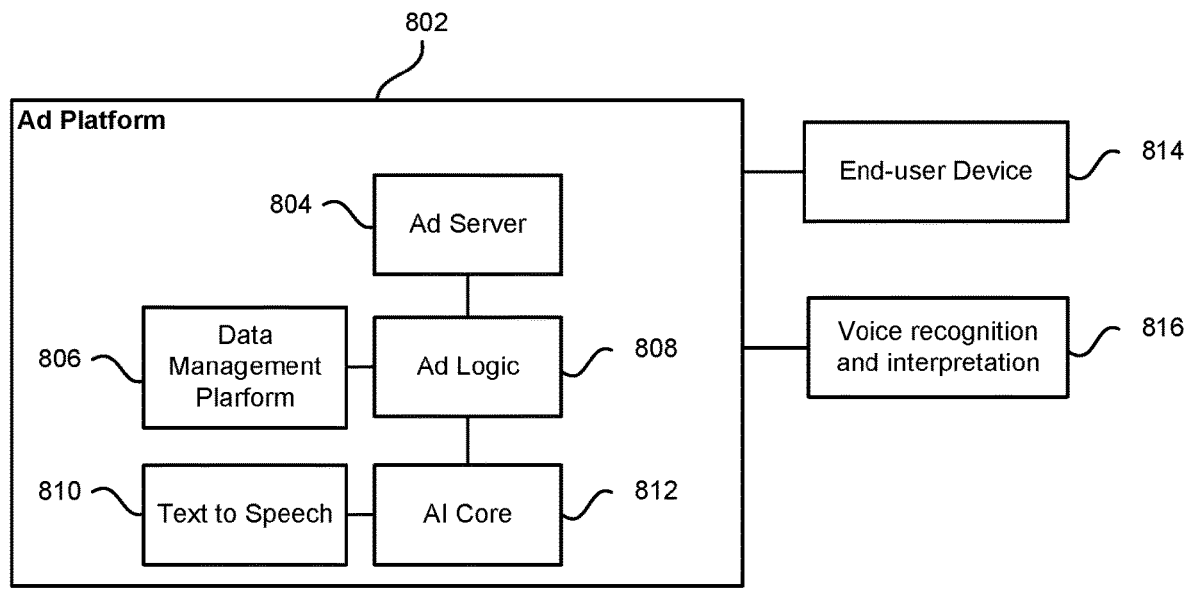
FIG. 8 is a schematic diagram of interaction between AI core with external software components included into an integrated advertisement system.

FIG. 8 schematically shows an exemplary embodiment of interaction between AI core and external software components included into integrated advertisement system. Advertisement platform 802 may include the following software components: advertisement server 804 for interaction between advertisement system and devices of users 814; Data Management Platform 806 for storage and access to data concerning users and their devices; advertisement logic 808 to select advertising campaign on the basis of advertiser's requirements, implement advertising system logics, and ensure interaction among all components as well as with the component for users' 816 responses recognition and interpretation; TTS 810 to convert text into speech; and AI Core 812 similar to that described above.

AI core for voice recognition and interpretation of user's 816 response provides both recognition and interpretation of user's response and transfer of interpretation result to advertisement logic 808.

Various features of advertisement logic 808 include: receiving data from AI core for recognition and interpretation of response from user 816; sending query to data management platform 806 to receive supplementary information about the user; recording data concerning user in Data Management Platform 806; selecting advertising campaign for the user; sending information to advertisement server 804 about what advertisement to show; making decision about processing of recognized user's response; transfer of data to AI Core 812 for issuing advertisement message to the user; receiving completed advertisement message from AI Core 812; and transfer of advertisement message to advertisement server 804 that was issued in AI Core 810.

Various features of TTS 810 include receiving query from AI Core 812 to convert the text of advertisement message into speech and returning result of conversion to AI Core 812.

Various features of data management platform 806 include: storage and accumulation of data concerning the users and their devices and providing access to data for other AI cores of platform 802.

Various features of advertisement server 804 include: receiving queries from the devices of users 814 for showing of advertisement; sending query to advertisement logic 808 to select advertising campaign; receiving advertisement message from advertisement logic 808; and sending advertisement message to the device of user 814.

Figure 9:
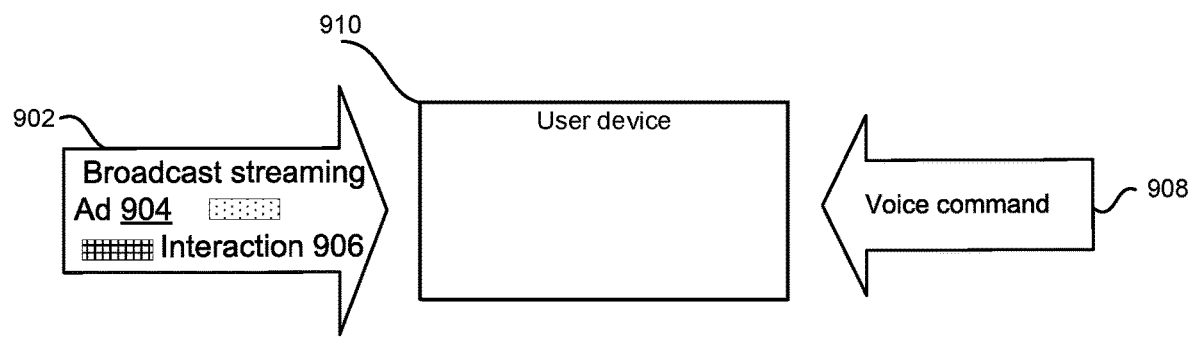
FIG. 9 is a schematic block data flow diagram of another embodiment of an interactive audio advertisement.

FIG. 9 is a schematic diagram of another embodiment of interactive audio advertisement, in which the data necessary for the performance of voice commands are transmitted during the reproduction of advertisement from the broadcaster. In this embodiment, the broadcaster provides streaming audio and/or audio-visual information stream 902, including data streams for advertisement 904 and interaction information 906 necessary for the performance of voice commands, along with the main stream of the broadcast.

User's device 910 receives the broadcast, which includes the advertisement message 904 and extracts the information from advertisement message 904 for the execution of commands. The information may include the following data: link to a web resource; phone number; e-mail address; date and time for adding the advertised event to the calendar; geographical coordinates; SMS text/text for a messenger; USSD request; web request to execute a command; and other related information.

Next, the listener device is switched to the standby mode, waiting for a voice command from the user.

When voice command 908 is received from the listener, device 910, based on this command and received interaction information 906, performs the specified action (for example, calls a phone number or requests the user to repeat the command). Commands 908 may initiate the following actions on the user device 910: click-through or download of a file; telephone call; creating and sending an email; creating calendar entries; building a route from the current location of the user to the destination point; creating and sending SMS messages, messages in instant messengers, or social networks; sending a USSD request; calling the online service method; adding a note; and other related functions.

Figure 10:
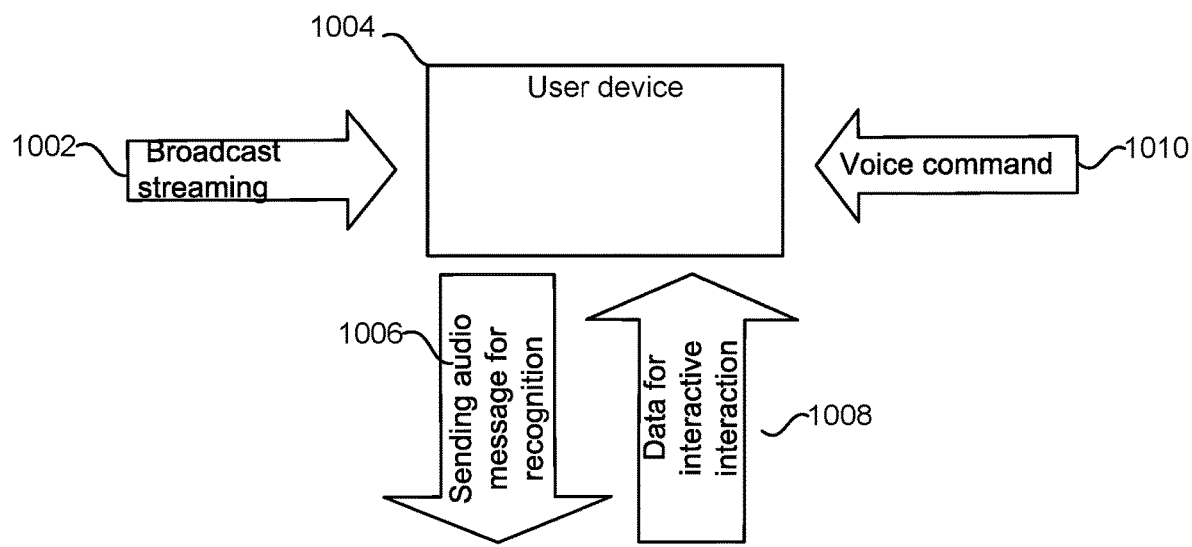
FIG. 10 is a schematic block data flow diagram of a further embodiment of an interactive audio advertisement.

FIG. 10 contains an alternative embodiment of interactive audio advertisement, in which the listener's device, during the reproduction of advertisement, identifies it and sends it to the advertisement system, receiving in return the data necessary for the execution of voice commands. The broadcaster broadcasts 1002, and user device 1004 receives broadcast 1002, reproduces it, and sends received stream 1006 to the advertisement system for recognition of advertisement. The advertisement system performs the analysis and recognition of advertisement in the stream received from the user's device. In case of successful recognition, the advertisement system returns to the user device 1004 the information 1008 necessary to execute the commands associated with this advertisement. The list of sent information is given above. If the advertisement message is not recognized, data transmission to user device 1004 is not performed. Next, the listener device 1004 is switched into standby mode, waiting for a voice command 1010 from the user. When the voice command 1010 is received from the listener, the device, based on this command and the received information, performs the specified action (for example, calls a phone number or requests the user to repeat the command). The list of user commands is given above.

Figure 11:
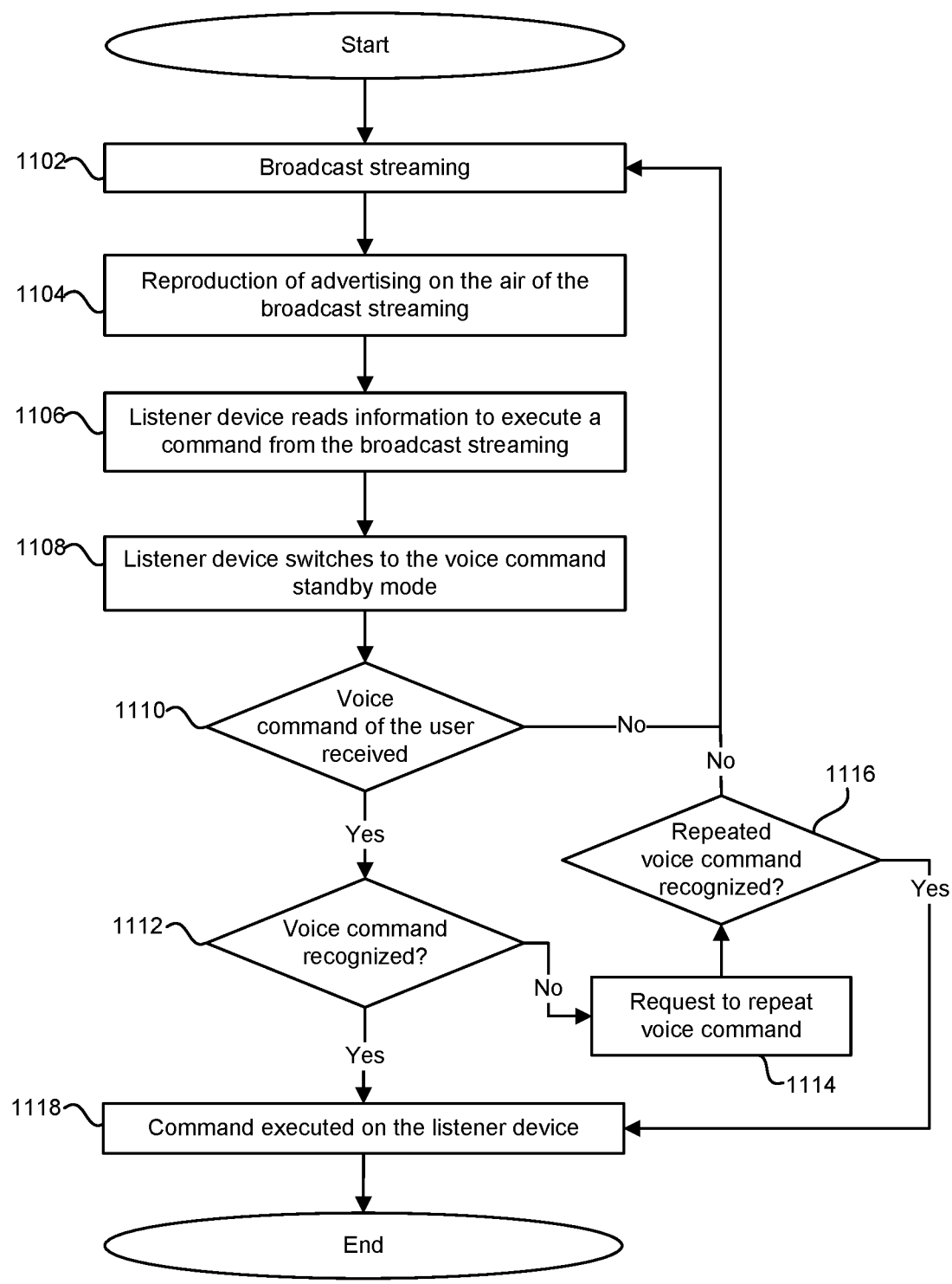
FIG. 11 is a flow chart diagram of an interactive audio advertisement when the listener's device receives the data needed to perform voice commands while the advertisement is playing from the broadcaster.

FIG. 11 shows an approximate scenario of an interactive audio advertisement when the listener's device receives the data needed to perform voice commands while the advertisement is playing from the broadcaster. In step 1102, the broadcaster streams live on the air. In step 1104, the advertisement is played on the air. In step 1106, the user device receiving the live broadcast gets the information required to perform the interactive operations. In step 1108, the user device is switched to the voice command standby mode. Step 1110 verifies that the device receives voice command while waiting. The following situations are possible: voice command received or voice command not received.

If the device received the user's voice command, then it goes to step 1112; otherwise reception of broadcast continues. Step 1112 verifies recognition of the user's voice command by the device. The following situations are possible: voice command recognized or voice command not recognized.

If the voice command is recognized, the command 1118 is generated and executed on the device using the information obtained in step 1106. Otherwise, the device generates a request to repeat command 1114. Step 1116 verifies the device's recognition of the user's repeated voice command. The following situations are possible: repeated voice command recognized or repeated voice command not recognized.

If the repeated voice command is recognized, the command 1118 is generated and executed on the device using the information obtained in step 1106. Otherwise, the device informs the user about the error in receiving the voice command, while the broadcast continues.

Figure 12:
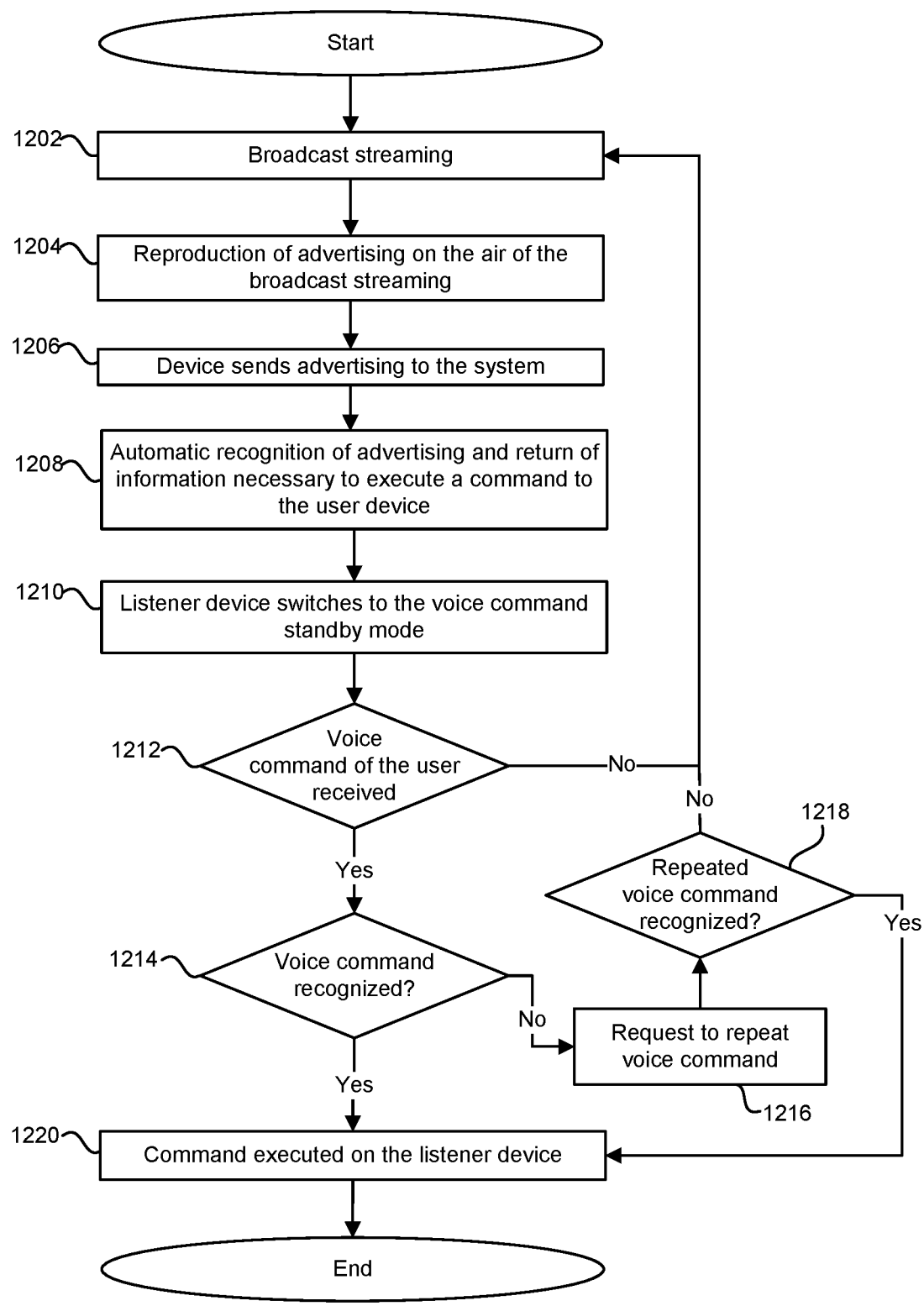
FIG. 12 is a flow chart diagram of an interactive audio advertisement, in which the listener's device, during the reproduction of advertisement, identifies the advertisement and sends it to the advertisement system, receiving in return the data necessary for the execution of voice commands.

FIG. 12 shows another embodiment of interactive audio advertisement, in which the listener's device, during the reproduction of advertisement, identifies the advertisement and sends it to the advertisement system, receiving in return the data necessary for the execution of voice commands. In step 1202, the broadcaster streams live on the air. In step 1204, the advertisement is played on the air. In step 1206, the user device receiving the broadcast sends it to the advertisement system for analysis. In step 1208, the advertisement service identifies advertisements when it receives the input stream from the user device. Then it directs the associated advertisement information to the user's device to perform voice commands. In step 1210, the user device is switched to the voice command standby mode. Step 2112 verifies that the device receives voice command while waiting. The following situations are possible: voice command received or voice command not received.

If the device received the user's voice command, then it goes to step 2112; otherwise reception of broadcast continues. Step 1212 verifies recognition of the user's voice command by the device. The following situations are possible: voice command recognized or voice command not recognized.

If the voice command is recognized, the command 1220 is generated and executed on the device using the information obtained in step 1208. Otherwise, the device generates a request to repeat command 1216. Step 1218 verifies the device's recognition of the user's repeated voice command. The following situations are possible: repeated voice command recognized or repeated voice command not recognized.

If the repeated voice command is recognized, the command 1220 is generated and executed on the device using the information obtained in step 1208. Otherwise, the device informs the user about the error in receiving the voice command, while the broadcast continues.

Figure 13:
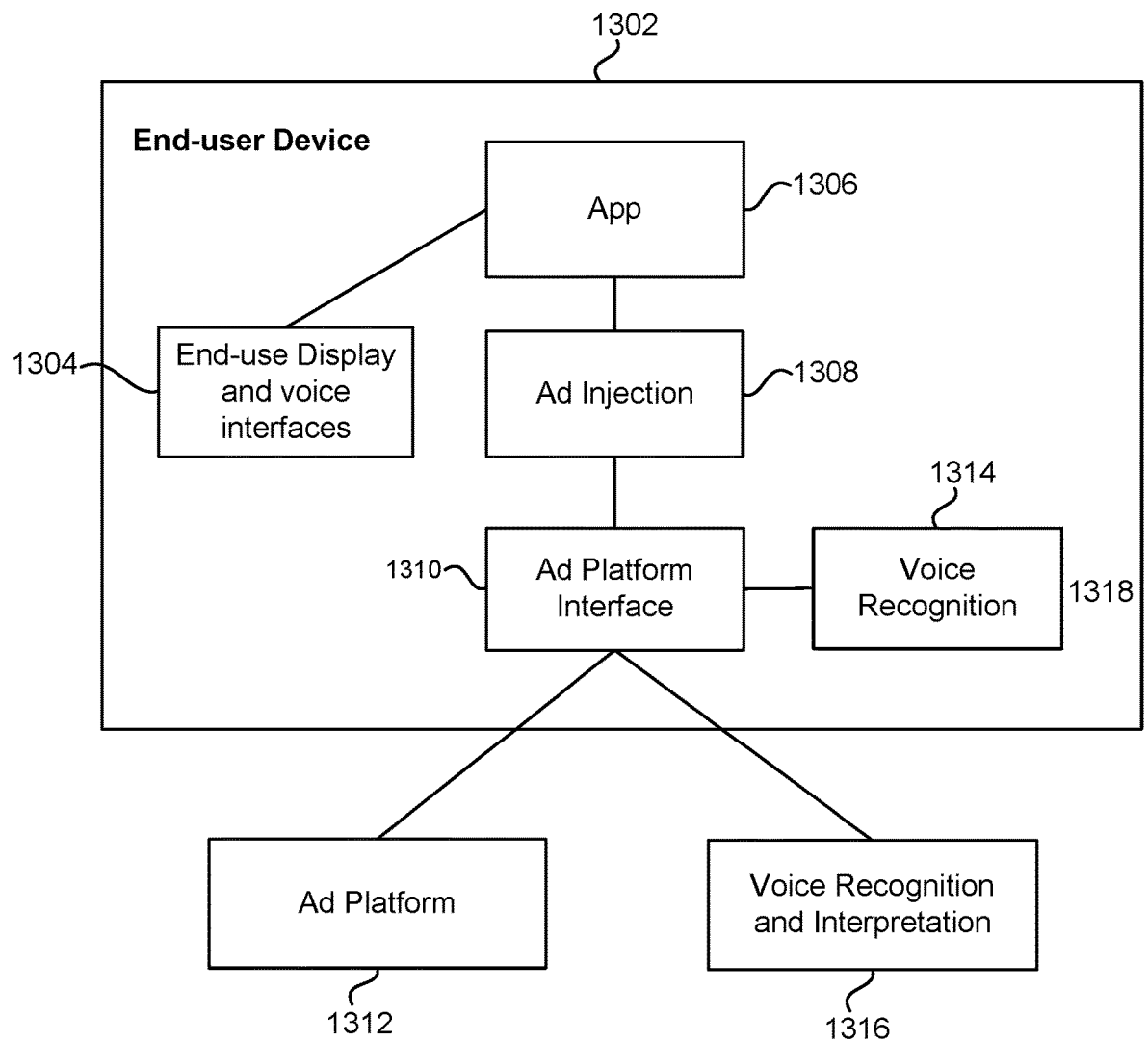
FIG. 13 is a flow chart diagram of interaction of software for the playback of an interactive advertisement with external software components as part of an integrated advertisement system.

FIG. 13 contains an example of the interaction of software for the playback of interactive advertisement with external software components as part of an integrated advertisement system. The end-user device 1302 may comprise the following components: end-user voice interface 1304, an interface for receiving voice messages (microphone); App 1306, an application installed on the user device through which streaming broadcast is played; advertisement Injection 1308, a module for placing information necessary for the execution of a voice command; advertisement platform Interface 1310, a component for communication with the Advertisement Platform 1312; and voice recognition, a module that manages the microphone of the user device and recognizes voice commands.

The user device interacts over the Internet with the following systems: advertisement platform 1312, an advertisement system; and voice recognition and interpretation 1316, a voice recognition system.

Various features of embodiments of the advertisement platform include setting up an advertisement campaign and related information for the implementation of a command, receiving from the voice recognition and interpretation module an interpreted user command, sending information related to the advertisement to the user device, and executing user commands.

Various features of embodiments of the Voice Recognition and Interpretation include receiving broadcasts from the user device, stream analysis and advertisement allocation, advertisement recognition, and sending the identification information of the recognized advertisement to the Advertisement Platform 1312.

End-user Display and voice interface 1304 receives broadcast streaming. App 1306 plays the stream on the user's device. Advertisement Injection 1308 gets the information required to run voice commands from the input stream or from the advertisement platform interface 1312. Voice recognition 1314 receives indications of advertisement being aired and waits for a voice command of the user.

Alternatively, in case of end-user display and voice interface 1304 being on the listener's device, during the playback of the advertisement, the advertisement is identified in advertisement injection 1308 and sent to advertisement platform 1312 via Advertisement Platform Interface 1310 In response, advertisement injection 1308 receives the data necessary for performing voice commands. Voice Recognition 1314 receives signals when the advertisement is on the air and waits for a voice command of the user.

When App 1306 receives a user's command recognized in Voice Recognition and Interpretation 1316 and information for the performance of voice commands obtained in Advertisement Injection 1308, it forms and implements an operation on the user device.

The aforementioned embodiments give specific examples of ways in which the present disclosure may be utilized. One advantage of embodiments of the present disclosure is that the server provides an end to end solution for voice activated end-user interactions. Typically, a remote device program for playing streaming, or in some cases downloaded, media activates those embodiments as the streaming media application is started on the remote device.

Once the end-user device sends an affirmative message to the server that a microphone or other audio sensing device is available, the server drives the end-user interaction on the remote device by sending the remote device the interaction materials, the end-user interaction operating independently of the streaming media. For example, the text of an informational message or advertisement with one or more possible responses may be sent to the remote device and presented to the end-user by a text box on the remote device screen, or an audio reproduction of the text may be played with the stream or between segments of the stream. Then the remote device obtains the voice information from the microphone and sends it to the server. Based on the voice information, the server may then send instructions to the remote device based on the end-user's response to the presented information.

As is known in the art, certain operations may be distributed amongst the server and the remote device. For example, the remote device may partially process the voice information before sending it to the server, it may completely interpret the end-user voice interaction and send the interpretation to the server, or it may simply record the end-user voice response and send the digital recording to the server.

Also, while the foregoing descriptions cover streaming media, that is audio and/or audio-visual streams of information that are transitorily stored on the remote device during the presentation of the audio or audio-visual, embodiments of the present disclosure also function with pre-recorded material that is downloaded to the remote device (for example, podcasts). Ideally, the remote device plays the downloaded media and coordinates presentation of end-user interaction material at appropriate times or places in the presentation of the downloaded material in coordination with the server. Further embodiments allow the server to send potential end-user interaction material to the remote device while connected to a network (for example, in conjunction with the download), which may be activated by playing the downloaded material, even if the remote device is no longer connected to the network (e.g., the Internet). To the extent possible, the remote device may execute some, if not all, of the operations. For example, the remote device may have connection to telephony but not computer network resources, so a phone call might occur but a visit to a web site would not occur. Once the remote device is again connected, the results of the user interaction may be synched to the server.

In addition to the serving of user interaction in conjunction with a stream, the server further uses information about the end-user and the streaming content to create and/or choose an appropriate user interaction. The end-user information includes the end-user's prior actions and preferences. For example, one end-user may prefer making telephone calls (as indicated by a predominance of telephonic interactions) while another end-user may prefer interacting with web sites (as indicated by a predominance of web site interactions).

According to further embodiments of the present disclosure, user interactions include advertisements, but may be a variety of interactions from public service announcements to reminders from the end-user's own calendar or task list. Examples include, but are not limited to, an end-user having a task of getting milk, having the interaction module present the audio message "one of your tasks today is to get milk, would you like to see a map to the nearest grocery, or order the milk from your preferred vendor?" and enabling the remote device to either display a map to the nearest grocery or order milk from the end-user's preferred food delivery service. Similarly, the interaction module may present a public service announcement like "There is a severe thunderstorm predicted for your home in an hour, would you like to call home, have a map for the quickest route home, or a map to the nearest safe location?" and enable the remote device to either call the home phone number or display the requested map.

The placement of the interactions may also be varied. As known in the art of serving advertisements, interaction material may be placed between pieces of streaming media content, e.g., between songs; over the content, e.g., superimposed on the existing audio during a radio streaming or a podcast; while playing a game, e.g., a background for the game or audio presented during the game; and so forth Embodiments of the disclosure also involve voice data collection. To enhance the AI capabilities, embodiments collect impersonal data from voice responses, like age range, gender, and emotions involved in the interaction. This allows the AI component to better understand the user behavior and preferences so that future interactions are more compatible with the end-user. This voice information is included in the post interaction analysis, allowing for learning from end-user preferences and behavior. Embodiments also facilitate reporting on end-user behavior on the macro level to enhance interactions.

Further improvements in embodiments of the present disclosure involve voice interpretation technology. Embodiments of the disclosure use natural language understanding (NLU), which does not require any specific keywords from end-users. By implementing NLU, embodiments of the disclosure allow end-users to express themselves in any way comfortable to them. This allows the standard software development kit (SDK) to be used by streaming media apps built for the remote device that covers any voice interactions, so that streaming media application developers do not need to have different SDKs for different use cases. In addition, advertisers are free to provide any advertisement content they feel comfortable with, meaning there are no restrictions on keywords to push to users. After a campaign starts using NLU, AI Core gathers data on user interaction to figure out how users respond to every advertisement and adjusts its understanding of intents based on that data.

Further embodiments include an exchange marketplace where various purveyors of interaction and publishers of streaming content may be connected. Organizations desiring interactions with end-users having certain characteristics viewing streaming media content of a specific nature may select end-user characteristics and/or streaming media content for initiation of interactions.

Embodiments of the disclosure provide several potential voice activations over a media stream (audio or audio-video) that are processed with associated metadata which includes one or more of the following: phone number to dial, email to use, promo code to save, address to build route to, and so forth. For example, an end-user may listen to a local radio station through a mobile app, hear a standard radio ad, then say, "call the company" and the remote device would then initiate a phone call. In some embodiments, such a scenario may occur by listening for a voice instruction during the advertisement break, while in other embodiments, a wake-word like "hey radio" would initiate the voice recognition. Embodiments of the disclosure initiate listening after receiving a request from an app on the remote device, or alternatively by tracking special markers which may be embedded in or recognized from the streaming media. This allows end-users to say voice commands over a radio advertisement and the interaction module delivers results by knowing what number to dial, what email to use, and so forth Further embodiments of the present disclosure utilize the AI core to create a new advertisement specifically for a particular end-user based on data previously collected from the end-user's interactions, other end-users' interactions, and the target action of the sponsoring organization. AI Core creates an interaction based on what works best specifically for a particular organization in order to provide the highest ROI possible for organization. For example, if a coffee house wanted to encourage a customer to return for another purchase, when the customer was sufficiently close to the coffee house, the interaction module might present the following interaction: "Hey <name>, since you are nearby, how about that same cappuccino you ordered yesterday at the coffee house?"

Figure 14:
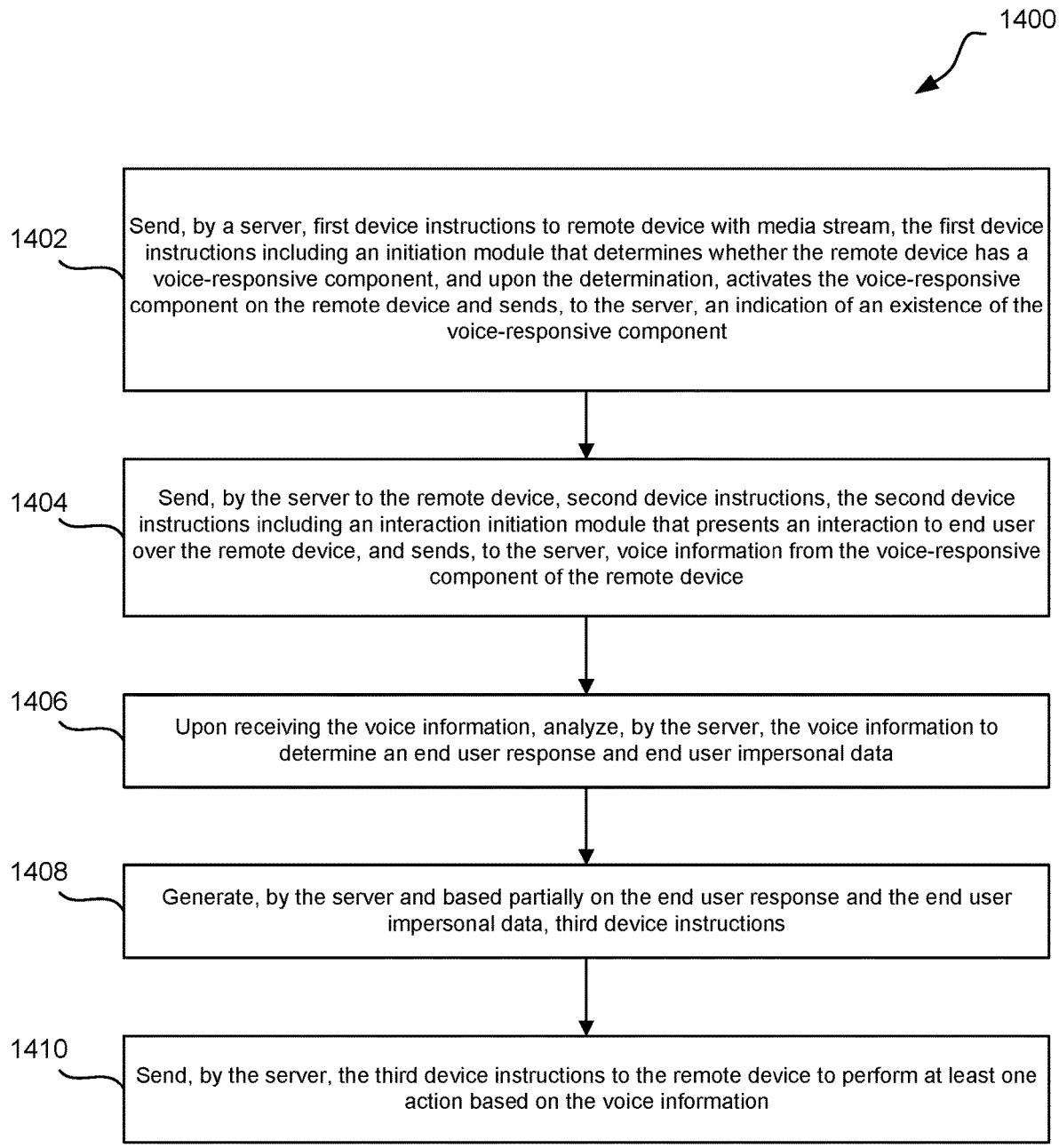
FIG. 14 is a flow chart diagram showing an example method for enabling voice-responsive content as part of a media stream to an end-user on a remote device.

FIG. 14 is a flow chart showing an example method 1400 for enabling voice-responsive content as part of a media stream to an end-user on a remote device. The method can be implemented by a server 110 shown in FIG. 1 or Advertisement Platform 401 shown in FIG. 4.

The method 1400 may commence, in block 1402, with sending first device instructions to the remote device with the media stream. The first device instructions may include an initiation module. The initiation module can determine whether the remote device has a voice-responsive component, and upon the determination, selectively activate the voice-responsive component on the remote device and send, to the server, an indication of the existence of the voice-responsive component.

In block 1404, the method 1400 may proceed with sending, to the remote device, second device instructions. The second device instructions may include an interaction initiation module. The interaction initiation module presents an interaction to the end-user over the remote device, and sends, to the server, voice information from the voice-responsive component of the remote device. The second device instructions may include muting the media stream and presenting the interaction as audio advertisements in a separate audio stream.

In block 1406, the method 1400 may proceed, upon receiving the voice information, with analyzing the voice information to determine an end-user response and end-user impersonal data.

In block 1408, the method 1400 may proceed with generating, based at least partially on the end-user response and the end-user impersonal data, third device instructions.

In block 1410, the method 1400 may proceed with sending the third device instructions to the remote device to perform at least one action based on the voice information. The interaction initiation module may present the interaction to the end-user concurrently as the media stream is presented to the end-user. The third device instructions may include a further interaction for presentation by the interaction initiation module. The interaction can be presented between items of content of the media stream, during presentation of a downloaded content, or while playing a game.

The third device instructions can be generated based on data concerning previous third device instructions sent to the remote device and data concerning previous voice information received from the remote device. The method may also include generating, based on the voice information, a voice response to the user. The third device instructions may include the voice response to the user to be played back on the remote device.

The method may also include collecting historical data, the historical data being related to previous second device instructions sent to the remote device, data concerning the end-user, and data received from the remote device. The collected historical data can be used to generate the second device instructions to present a customized interaction.

The initiation module may send, to the server, information about the remote device and information about the end-user. The third device instructions can be generated based on at least one of the information about the remote device and the information about the end-user. The information about the remote device may include current geolocation data (for example, GPS coordinates) of the remote device. The third device instructions may include an advertisement selected based on current geolocation data.

The end-user impersonal data may include an age range of the end-user, a gender of the end-user, emotions of the end-user during the interaction, and an indication of a potential chronic or non-chronic illness the end-user may have. The third device instructions may include an advertisement selected based on the end-user impersonal data. The end-user impersonal data may be stored in an end-user profile at the server for determining end-user preferences. The end-user preferences can be further used to determine a type of advertisements most relevant to the end-user. The most relevant advertisements can be presented to the end-user on the remote device in the current interaction or future interactions.

In some embodiments, the analysis of the voice information may also include determination of context of media content the end-user listens to. The information about the context can be used to determine the end-user preferences and interests. The end-user preferences can be stored in the end-user profiles. The end-user preferences can be used for determining type, creative, and subject of the advertisements to be presented to the end-user in the current interaction.

The historical data of interactions of multiple end-users with the server for enabling voice-responsive content, the end-user profiles, and the end-user preferences can be analyzed to determine historical user factors. The historical user factors may include age, gender, preferences, interests, emotional factors during interactions, keywords pronounced by the users during the interactions, and so forth. The historical user factors can be associated with creatives of advertisements presented during the interactions. The historical user factors can be further used to determine one or more features for the creative of advertisement to be selected next time for a specific end-user or a specific group of end-users.

The historical data of interactions, end-user profiles, and end-user preferences belonging to a specific group of end-users can be used to determine parameters of text to be used in an advertisement creative for the specific group of the end-users. The parameters of text may include specific words, emotional level of pronouncing the words, type of a voice of narrator pronouncing the words, and so forth. A TTS module can be further used to synthesize, based on the parameters of text, an audio signal representing the voice of narrator. The audio signal can be further used in an advertisement to be presented to the end-users belonging to the specific group.

In some embodiments, the second device instructions may include a question to the user about a type of advertisement the end-user wants to listen to. In some embodiments, the question may include a list of subjects of advertisements. For example, the subjects may include "food," "travel," "cars," and so on. The determination of the end-user response may include determination, based on the voice information received from the remote device, of a subject of an advertisement selected by the end-user. The advertisement can be selected based on the determined subject. Information about the advertisement selected by the end-user and selected by the subject can be stored in the end-user profile. This information can be used to determine whether the selected advertisement should be presented to the end-user on the remote device. The information can be used to determine whether this advertisement should be presented to the end-user in future interactions.

In some embodiments, the analysis of the voice information may also include determining ambient sound associated with the remote device and current location of the remote device. The ambient sound may be analyzed to determine one or more factors affecting delivery of the advertisements. These factors may include location of the end-user and the remote device ("at home," "in an office," "in street," and so forth) and a level of the noise in the ambient sound. The factors can be periodically collected over time and stored in the end-user profile. The analysis may further include determination of periodicity or other dependency of the level of noise, duration of the noise, and type of the noise with respect to the daytime or days of the week. The analysis may also include determination as to whether the end-user uses headphones for listening to the media content. The factors can be further used for determining an optimal day and time for delivering and optimal location of the remote device at which the advertisements can be delivered to the end-user via the remote device.

In some embodiments, the analysis of the voice information may also include identifying the end-user based on the end-user's voice. Once the end-user has been identified, the method may proceed with retrieving information including the end-user profile, the end-user preferences, and types of advertisements previously presented to the end-user. The identification of the end-user based on the voice may allow collecting historic data of interactions between the server and the end-user via two and more different remote devices used by the end-user. The identification may include determining the end-user voice features and comparing the end-user voice features to voice features previously received from a device different than the remote device. The history data can be then used for selecting advertisements to be presented to the end-user.

Thus, methods of and systems for enabling voice-responsive content as part of a media stream to an end-user on a remote device have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A server for enabling voice-responsive content as part of a media stream to an end-user on a remote device, the server comprising one or more processors and a memory storing processor-executable codes, wherein the one or more processors are configured to implement the following operations upon executing the processor-executable codes:
   sending first device instructions to the remote device with the media stream, the first device instructions including an initiation module configured to determine whether the remote device has a voice-responsive component, and upon the determination, selectively activate the voice-responsive component on the remote device and send, to the server, an indication of the existence of the voice-responsive component;
   sending, to the remote device, second device instructions, the second device instructions including an interaction initiation module that presents an interaction to the end-user over the remote device, and sends, to the server, voice information from the voice-responsive component of the remote device; and
   upon receiving the voice information:
      analyzing the voice information to determine an end-user response and end-user impersonal data;
      generating, based partially on the end-user response and the end-user impersonal data, third device instructions; and
      sending the third device instructions to the remote device to perform at least one action based on the voice information.

2. The server of claim 1, wherein the interaction initiation module presents the interaction to the end-user concurrently with the media stream delivered to the end-user.

3. The server of claim 1, wherein the third device instructions include a further interaction for presentation by the interaction initiation module.

4. The server of claim 1, wherein the interaction is presented between items of content of the media stream, during presentation of a downloaded content, or while playing a game.

5. The server of claim 1, wherein the third device instructions are generated based on data concerning previous third device instructions sent to the remote device and data concerning previous voice information received from the remote device.

6. The server of claim 1, further comprising generating, based on the voice information, a voice response to the user; and
   wherein the third device instructions include the voice response to the user to be played back on the remote device.

7. The server of claim 1, further comprising collecting historical data, the historical data being related to previous second device instructions sent to the remote device, data concerning the end-user, and data received from the remote device, wherein the collected historical data is used to generate the second device instructions to present a customized interaction.

8. The server of claim 1, wherein:
   the end-user impersonal data includes one of: an age range of the end-user, a gender of the end-user, emotions of the end-user during the interaction, an indication of a potential chronic or non-chronic illness of the end-user; and
   the third device instructions include an advertisement selected based on the end-user impersonal data.

9. The server of claim 1, wherein:
the initiation module sends, to the server, information about the remote device and information about the end-user; and
the third device instructions are generated based on at least one of the information about the remote device and the information about the end-user.

10. The server of claim 9, wherein:
the information about the remote device includes current geolocation data of the remote device; and
the third device instructions include an advertisement selected based on the current geolocation data.

11. The server of claim 1, wherein the second device instructions include muting the media stream and presenting the interaction as audio advertisements in a separate audio stream.

12. A method implemented by a server for enabling voice-responsive content as part of a media stream to an end-user on a remote device, the method comprising:
sending first device instructions to the remote device with the media stream, the first device instructions including an initiation module that determines whether the remote device has a voice-responsive component, and upon the determination, selectively activates the voice-responsive component on the remote device and sends, to the server, an indication of the existence of the voice-responsive component;
sending, to the remote device, second device instructions, the second device instructions including an interaction initiation module that presents an interaction to the end-user over the remote device, and sends, to the server, voice information from the voice-responsive component of the remote device; and
upon receiving the voice information:
analyzing the voice information to determine an end-user response and end-user impersonal data;
generating, based partially on the end-user response and the end-user impersonal data, third device instructions; and
sending the third device instructions to the remote device to perform at least one action based on the voice information.

13. The method of claim 12, wherein the interaction initiation module presents the interaction to the end-user concurrently with presenting the media stream to the end-user.

14. The method of claim 12, wherein the third device instructions include a further interaction for presentation by the interaction initiation module.

15. The method of claim 12, wherein the interaction is presented between items of content of the media stream, during presentation of a downloaded content, and while playing a game.

16. The method of claim 12, wherein the third device instructions are generated based on data concerning previous third device instructions sent to the remote device and data concerning previous voice information received from the remote device.

17. The method of claim 12, further comprising generating, based on the voice information, a voice response to the user; and
wherein the third device instructions include the voice response to the user to be played back on the remote device.

18. The method of claim 12, further comprising collecting historical data, the historical data being related to previous second device instructions sent to the remote device, data concerning the end-user, and data received from the remote device, wherein the collected historical data are used to generate the second device instructions to present a customized interaction.

19. The method of claim 12, wherein:
the end-user impersonal data includes one of: an age range of the end-user, a gender of the end-user, emotions of the end-user during the interaction, an indication of a potential chronic or non-chronic illness of the end-user; and
the third device instructions include an advertisement selected based on the end-user impersonal data.

20. A non-transitory processor-readable medium having instructions stored thereon, which when executed by one or more processors, cause the one or more processors to implement a method implemented by a server for enabling voice-responsive content as part of a media stream to an end-user on a remote device, the method comprising:
sending first device instructions to the remote device with the media stream, the first device instructions including an initiation module that determines whether the remote device has a voice-responsive component, and upon determination of the voice-responsive component, activates the voice-responsive component on the remote device and sends, to the server, an indication of the existence of the voice-responsive component;
sending, to the remote device, second device instructions, the second device instructions including an interaction initiation module that presents an interaction to the end-user over the remote device, and sends, to the server, voice information from the voice-responsive component of the remote device; and
upon receiving the voice information:
analyzing the voice information to determine an end-user response and end-user impersonal data;
generating, based partially on the end-user response and the end-user impersonal data, third device instructions; and
sending the third device instructions to the remote device to perform at least one action based on the voice information.

\* \* \* \* \*